UNITED STATES PATENT OFFICE.

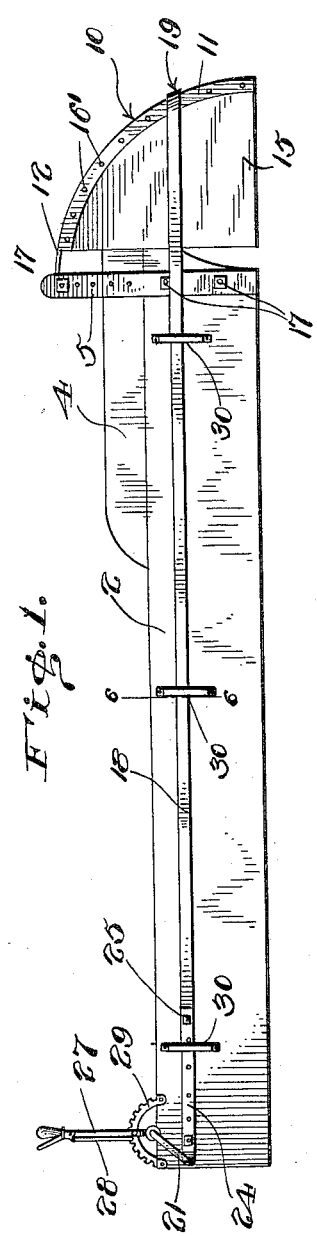
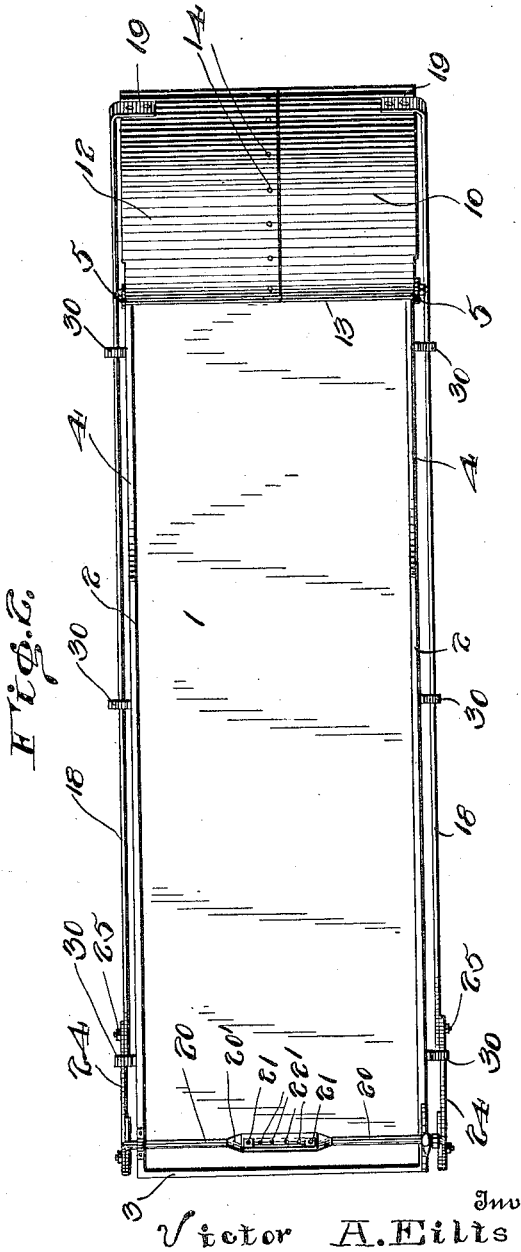

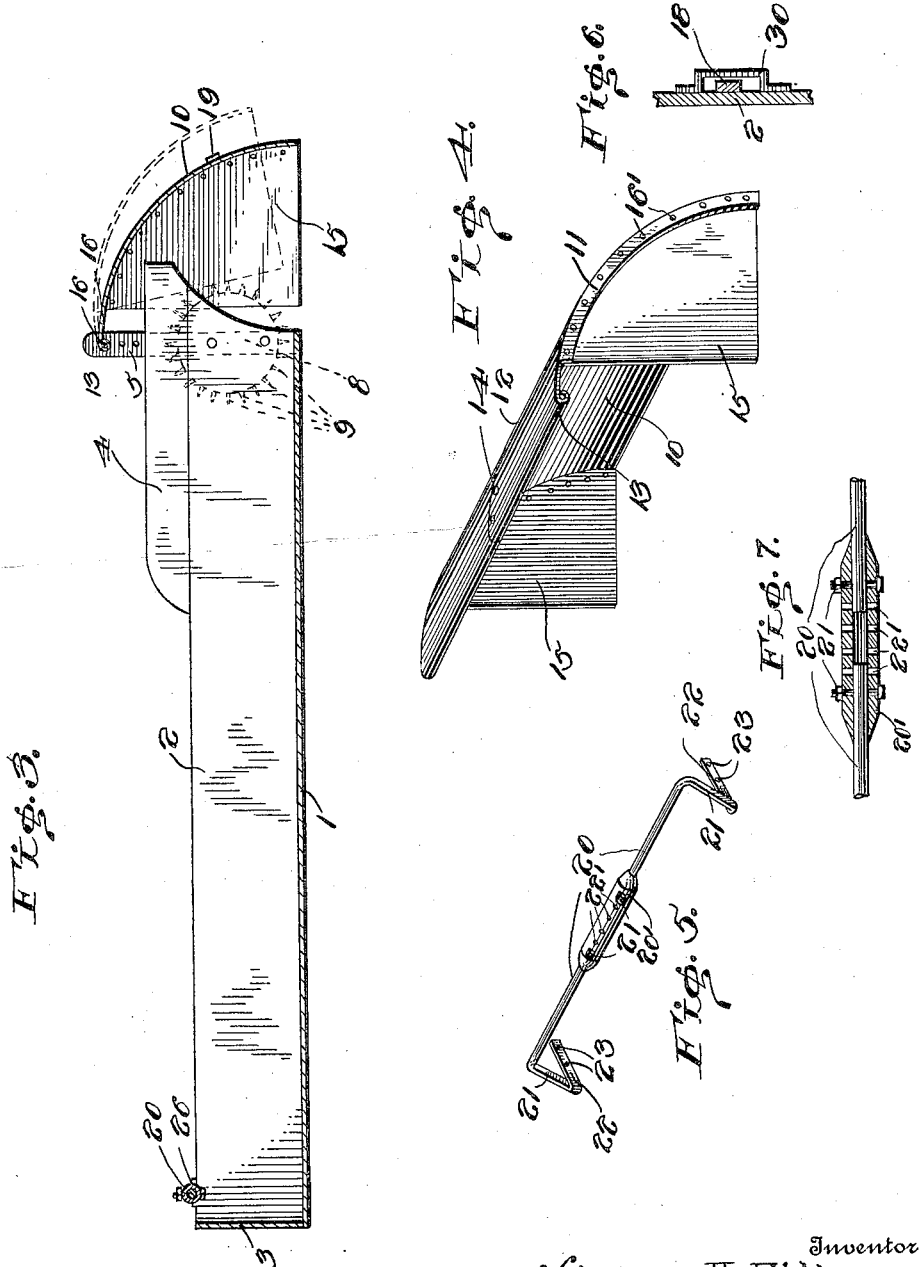

VICTOR A. EILTS, OF RUSH CENTER, KANSAS.

WIND-SHIELD FOR MANURE-SPREADERS.

1,101,530.　　　　　Specification of Letters Patent.　　Patented June 30, 1914.

Application filed September 9, 1913. Serial No. 789,010.

*To all whom it may concern:*

Be it known that I, VICTOR A. EILTS, a citizen of the United States, residing at Rush Center, in the county of Rush and State of Kansas, have invented certain new and useful Improvements in Wind-Shields for Manure-Spreaders, of which the following is a specification, reference being had therein to the accompanying drawing.

This invention relates to a wind shield for a manure spreader and has for its object the production of a simple and efficient means for allowing the manure to be spread evenly, and preventing the wind from blowing the manure to one side or back into the spreader.

Another object of the invention is the production of a wind shield for a manure spreader which is adjustably supported so as to allow the manure to be passed from the spreader in a small or large quantity, as desired.

With these and other objects in view, this invention consists of certain novel combinations, constructions and arrangements of parts as will be hereinafter fully described and claimed.

In the accompanying drawings: Figure 1 is a side elevation of a spreader showing the adjustable wind shield carried thereby. Fig. 2 is a top plan view of the device. Fig. 3 is a central longitudinal section taken through the invention. Fig. 4 is a perspective view of the wind shield showing the same detached. Fig. 5 is a detailed perspective view of the operating crank arm. Fig. 6 is a section taken on the line 6—6 of Fig. 1. Fig. 7 is a longitudinal section through the adjusting sleeve.

Referring to the accompanying drawings, 1 designates the bottom of the manure spreader which is provided with the usual sides 2 and front 3. The sides 2 are provided with the longitudinally extending side cleats 4 carried adjacent their rear ends. The sides 2 are provided with the vertical standards 5 having a plurality of openings 6. These standards 5 are fixedly secured to the sides 2 by means of the bolts 7, and are formed of sufficient length to extend above the sides 2 and the cleats 4. In order to pass the manure from the spreader, there is provided a suitable roller 8, as illustrated in dotted lines in Fig. 3, having spurs 9. This roller may be operated by any suitable means, such means not being deemed necessary to be shown in the drawings.

In order to allow the manure to be spread evenly, and to prevent the same from being blown to one side or back into the spreader, there is provided a wind shield which is provided with a curved back 10 which carries at each edge a depending flange 11. This back 10 is provided with an extending portion 12 which extends beyond the end of the flanges 11 and terminates in a rolled sleeve 13. This back is formed of a pair of sections riveted together, as illustrated at 14. The end pieces 15 are secured to the flanges 11 by means of rivets 16' or any other suitable manner. In this manner it will be seen that the wind shield comprises a hood like structure. A supporting rod 16 passes through the sleeve 13 and is held upon the vertical standards 5 by passing the end portions of the rod through the openings 6, at which time the nuts 17 may be placed thereon. By forming the wind shield, above described, and pivotally securing the same to the vertical standards, it will be seen that the rear portion of the spreader will be shielded from the wind as the wind shield will overhang the end portions of the spreader.

In order to adjust the wind shield there is provided a plurality of longitudinally extending operating rods 18 which have laterally bent feet 19 riveted to the curved back 10. The forward portion of the sides 2 support a crank arm 20 having depending ends 21 terminating in rearwardly extending fingers 22. These fingers 22 are provided with apertures 23 for allowing the fingers to be secured to a plate 24, this plate 24 being secured to the operating rods 18, as indicated at 25. The crank arm 20 is held upon the forward portion of the sides 2 by means of the brackets 26. In order to operate the crank arm 20 there is provided a lever 27 which is fixedly secured to the crank arm 20. This lever 27 is provided with the locking member 28 which engages the rack 29 carried by one of the sides 2. By moving this lever back or forward, the crank arm 20 will rotate as the same is held securely upon the sides 2. This rotation will cause the fingers 22 to move backward or forward whereby the longitudinally extending operating rods 18 will either swing the wind shield open or toward a closed position. Each side 2 is also provided with the substantially U-shaped brackets 30 through which the operating rod 18 passes.

When this device is used it will assume the position illustrated in Fig. 1 at which time the roller 8 will cause the manure to be passed out over the end of the bottom 1. If the wind is blowing it will be seen that the manure will still be spread evenly as the ends 15 and the curved back 10 will prevent the wind from blowing the manure and consequently it will spread evenly upon the ground. If the wind is blowing at a very high rate, by swinging the lever 27 rearwardly the wind shield will be caused to swing down so as to prevent the wind from blowing up under the same. This hood assumes the position illustrated in dotted lines at Fig. 3. If, however, it is desired to raise the hood by swinging the same upon the supporting rod 16 as shown in dotted lines in Fig. 3 by moving the lever 27 forwardly, the wind shield will be swung to an open position.

From the foregoing description it will be seen that a simple and efficient device has been produced which will prevent the wind from blowing the manure back into the spreader and which is so mounted as to allow the same to be easily adjusted according to the velocity of the wind.

The arm 20 is provided near the center thereof with an adjustable sleeve 20′ in which the adjacent ends of the several sections of the arm 20 fit. Bolts 21′ pass through the adjusting apertures 22′ whereby the arm 20 may be held in an adjusted position to fit different width spreaders.

What is claimed, is:—

1. In a device of the class described the combination with a body, said body provided with a plurality of fixedly secured standards, a wind shield adjustably secured to said standards, said wind shield comprising a curved back, said back provided at each end with a depending flange, end portions carried by the end portions of said back and secured to said depending flanges, and means for swinging said wind shield upon said standards to an open or closed position.

2. In a device of the class described the combination with a body, standards fixedly secured to said body, a wind shield provided with a hood-like structure adjustably and pivotally secured to said standards so as to overhang the end of said body, operating rods fixedly secured to said wind shield and extending longitudinally of said body, a crank arm pivotally secured to said body, an operating lever carried by said crank arm for moving the same, said crank arm provided with depending ends terminating in rearwardly bent fingers, said fingers being secured to said operating rods whereby said hook may be swung to an open position or swung to a closed position by moving said lever.

In testimony whereof I hereunto affix my signature in presence of two witnesses.

VICTOR A. EILTS.

Witnesses:
 LOUIE R. MISEGADIS,
 SAM E. RENFRO.

Copies of this patent may be obtained for five cents each, by addressing the "Commissioner of Patents, Washington, D. C."